Figure 1:
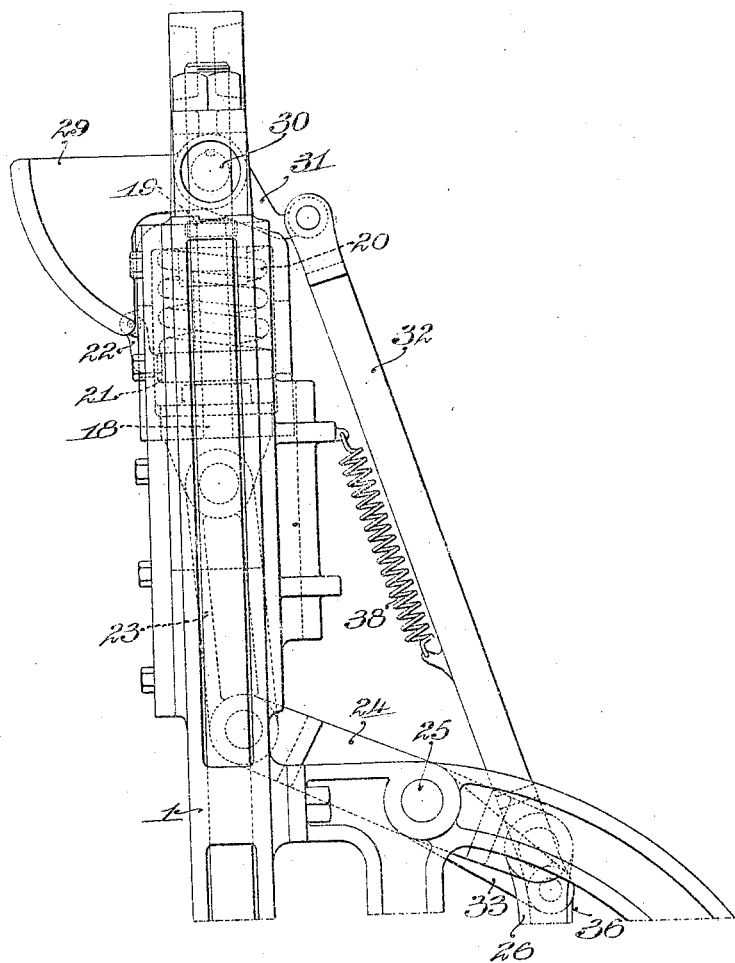

No. 818,504. PATENTED APR. 24, 1906.
E. E. WINKLEY.
SOLE PRESSING MACHINE.
APPLICATION FILED APR. 2, 1903.

7 SHEETS—SHEET 3.

No. 818,504.   PATENTED APR. 24, 1906.
E. E. WINKLEY.
SOLE PRESSING MACHINE.
APPLICATION FILED APR. 2, 1903.

7 SHEETS—SHEET 5.

Witnesses
John F. C. Printkirk
Farnum F. Dorsey

Inventor
Erastus E. Winkley
by his Attorneys
Phillips Van Everen & Fish

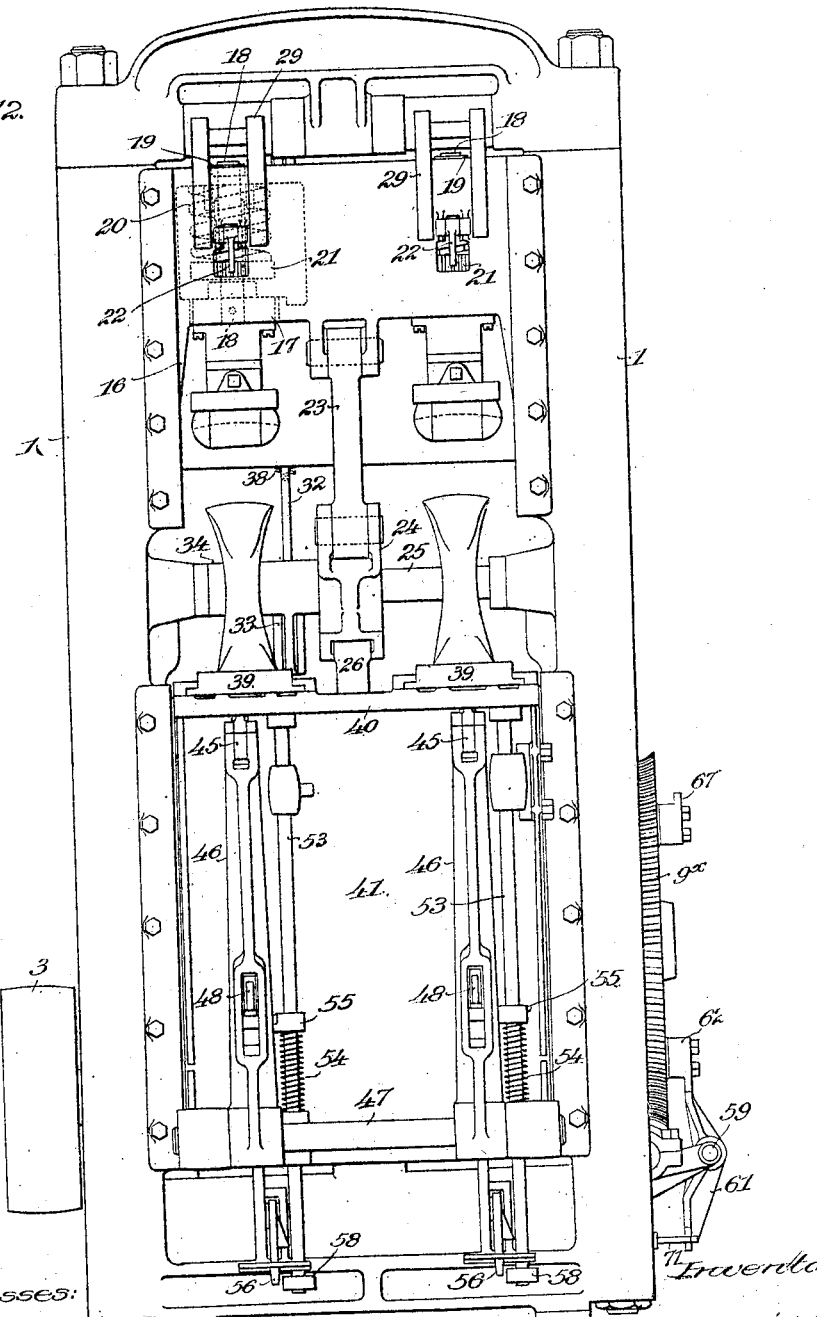

UNITED STATES PATENT OFFICE.

ERASTUS E. WINKLEY, OF LYNN, MASSACHUSETTS.

SOLE-PRESSING MACHINE.

No. 818,504.　　　　Specification of Letters Patent.　　　Patented April 24, 1906.

Application filed April 2, 1903. Serial No. 150,703.

*To all whom it may concern:*

Be it known that I, ERASTUS E. WINKLEY, a citizen of the United States, residing at Lynn, in the county of Essex and State of Massachusetts, have invented certain new and useful Improvements in Sole-Pressing Machines; and I do hereby declare the following to be a full, clear, and exact description of the invention, such as will enable others skilled in the art to which it appertains to make and use the same.

The present invention relates to sole-pressing machines, which are used in the manufacture of boots and shoes to perform the operations of sole laying and sole leveling.

More particularly the present invention relates to sole-pressing machines of the so-called "direct-pressure" type, in which the sole is simultaneously subjected to pressure over its entire surface between a suitable-shaped form and a jack upon which the shoe is supported.

The invention is intended primarily as an improvement on the sole-pressing machine disclosed in my pending application, Serial No. 34,011, filed October 23, 1900. In the machine disclosed in my pending application mechanism is provided which acts automatically and continuously to relatively actuate the jack and form to bring them into a position of pressure to hold them in a position of pressure for a predetermined time and to thereafter return the jack to a position of presentation. For the best results it is desirable in direct-pressure sole-pressing machines to hold the jack and form in a position of pressure for a time varying with the thickness and quality of the sole, and a feature of my invention contemplates providing means whereby the time during which the jack and form are held in a position of pressure may be varied as desired. This feature of my invention I consider broad and generic in character, and while it is preferably embodied in a machine in which the jack is automatically returned to a position of presentation it may be embodied in any direct-pressure sole-pressing machine comprising mechanism which acts automatically to bring the jack and form into a position of pressure to hold the jack and form in such position and thereafter separate the jack and form, and means whereby the time during which the jack and form are held in a position of pressure may be varied.

In the machine disclosed in my prior application the cam-shaft from which the relative movement is imparted to the jack and form to bring them into a position of pressure is rotated continuously until brought to rest at the end of the pressing operation, the jack and form being held in a position of pressure for a predetermined time by means of a dwell on the actuating-cam.

In carrying out my present invention I have provided mechanism for relatively actuating the jack and form to press the sole of a shoe and have provided means acting automatically to stop said mechanism with the jack and form in a position of pressure and means acting automatically to thereafter start the mechanism for relatively actuating the jack and form into operation, said last-mentioned means having provision for adjustment whereby the time during which the mechanism for relatively actuating the jack and form is stopped with the jack and form in a position of pressure may be varied. So far as I am advised, I am the first to provide a direct-pressure sole-pressing machine with means for automatically stopping the mechanism for relatively actuating the jack and form with the jack and form in a position of pressure and for thereafter automatically starting said mechanism into operation, and I accordingly consider a feature of my invention to consist, broadly, in providing a direct-pressure sole-pressing machine with such means whether or not provision is made for varying the time during which the jack and form remain in a position of pressure.

In addition to the broad features of invention above referred to, my invention also consists in certain devices, combinations and arrangements of parts, the advantages of which will be obvious to those skilled in the art from the following description.

A preferred form of my invention is illustrated in the accompanying drawings, in which—

Figure 2:
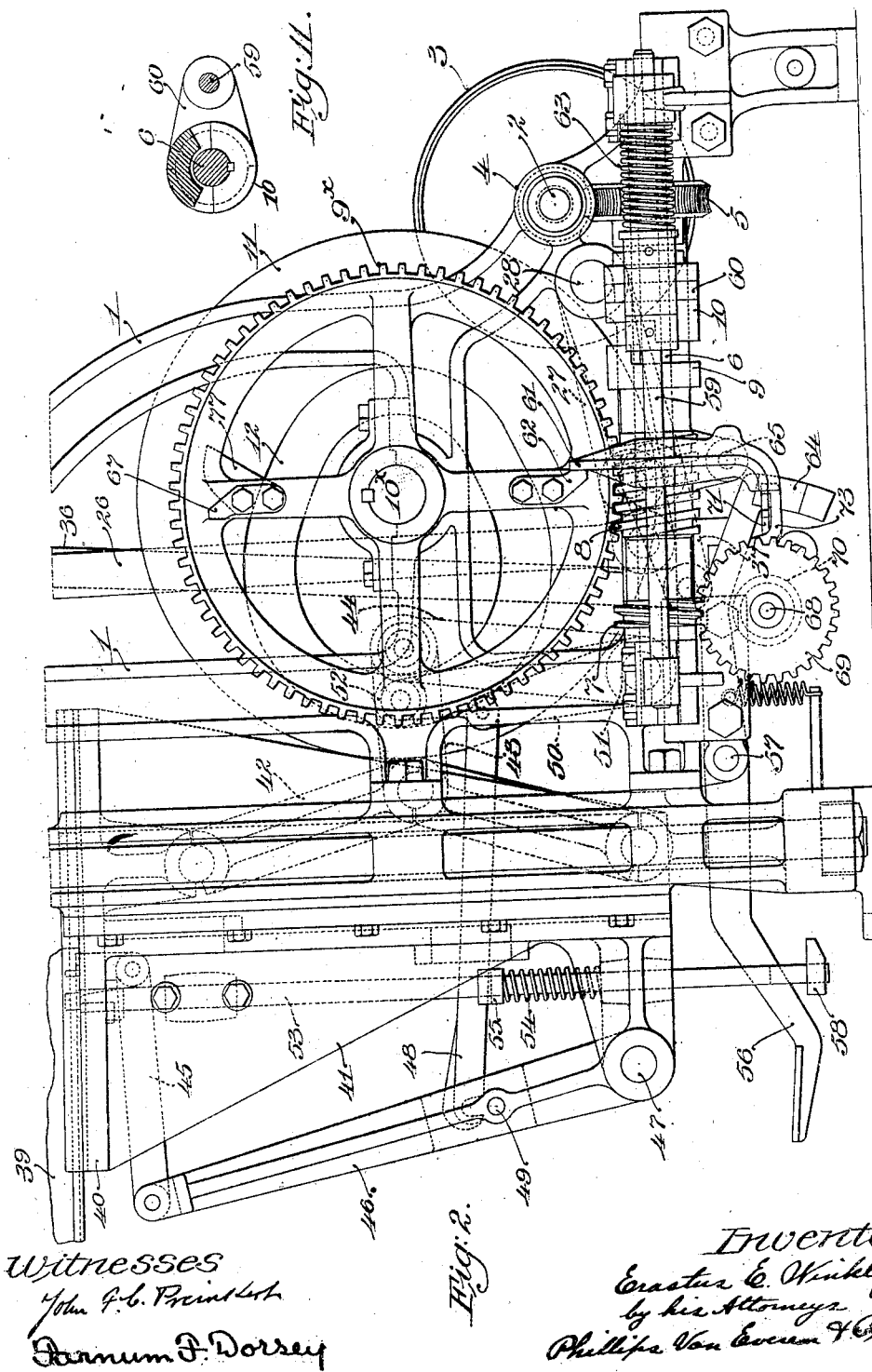
Figure 3:
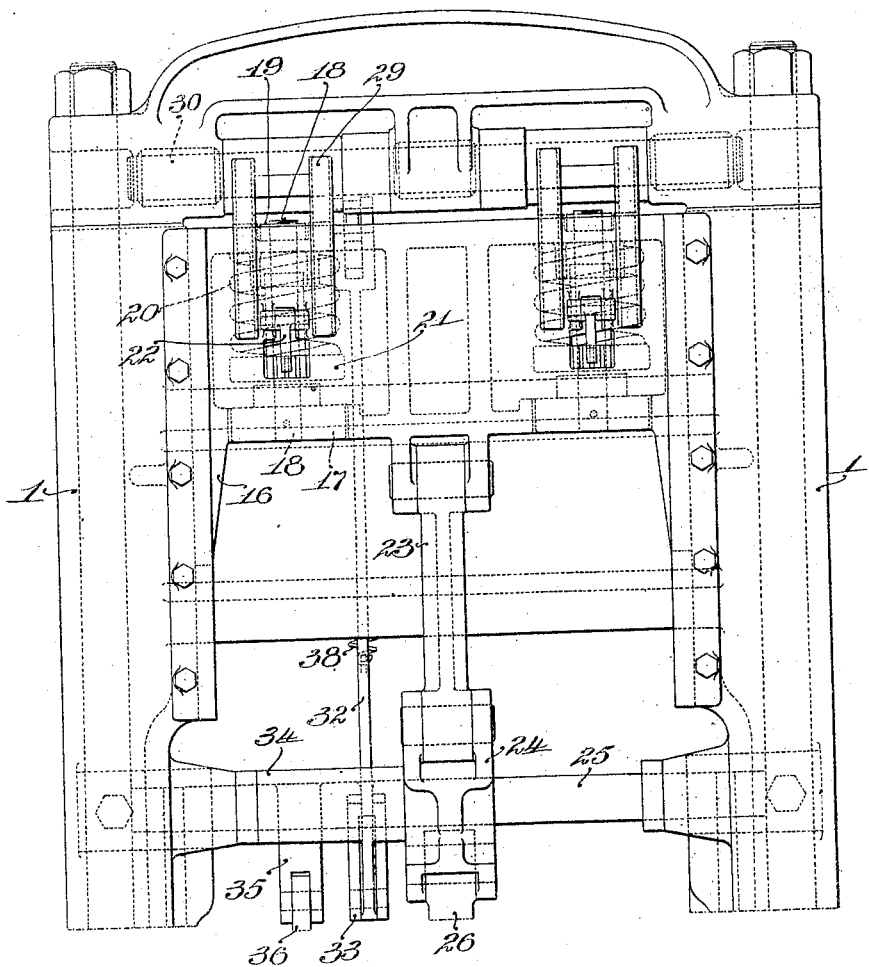
Figure 4:
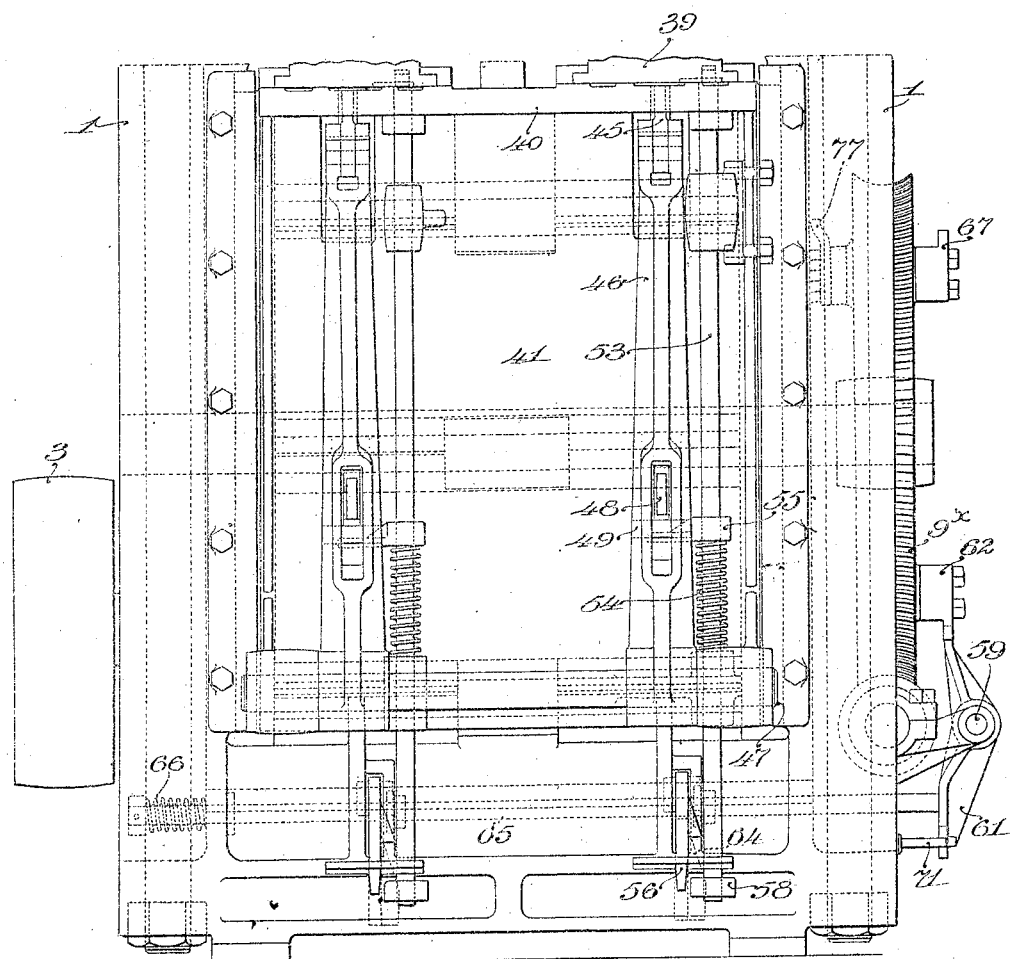

Figure 1 is a view in side elevation of the upper portion of a direct-pressure sole-pressing machine embodying the same. Fig. 2 is a view in side elevation of the lower portion of the machine, this view taken in connection with Fig. 1 constituting a view in side elevation of the complete machine. Fig. 3 is a view in front elevation of the upper portion of the machine, and Fig. 4 is a similar view of the lower portion of the machine, the two views taken together constituting a view in front elevation of the complete machine.

Figure 5:
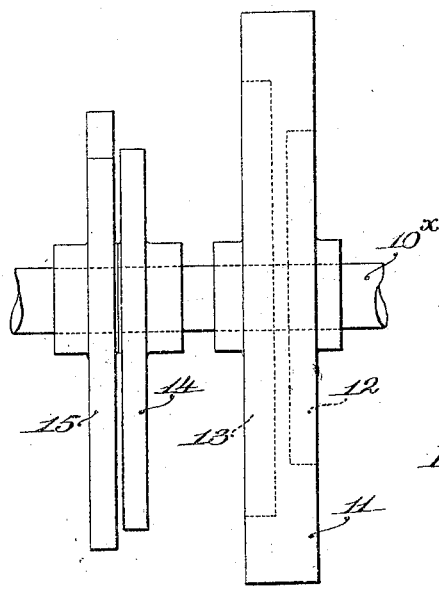
Figure 6:
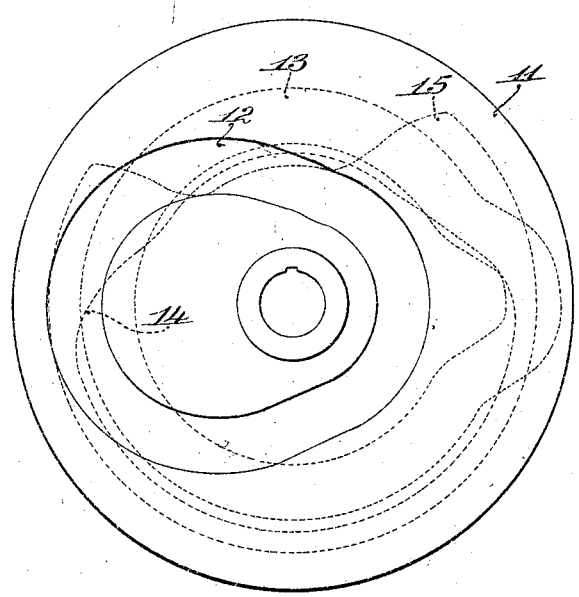
Figure 7:
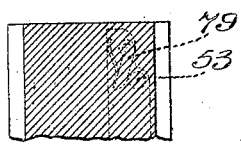
Figure 8:
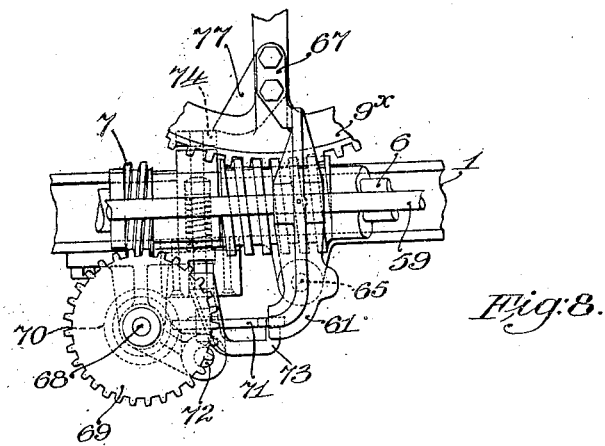
Figure 9:
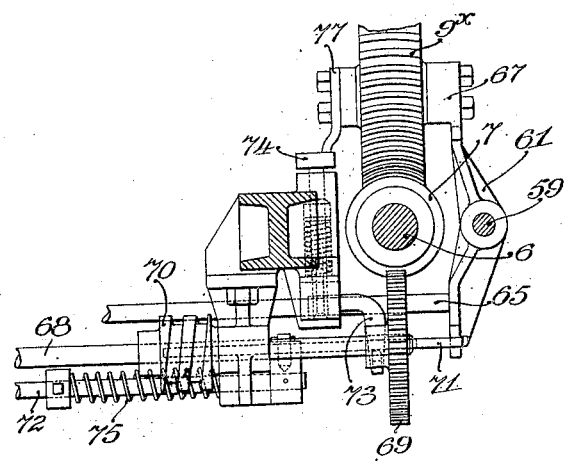
Figure 10:
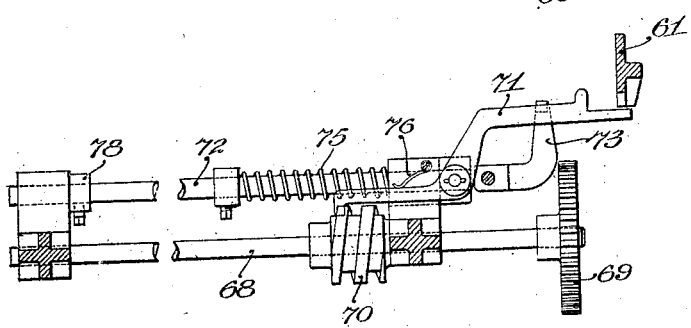

Fig. 5 is a view in side elevation of a portion of the cam-shaft with the cams thereon. Fig. 6 is a view of the cams illustrated in Fig. 5 looking toward the left. Fig. 7 is a detail sectional view illustrating a portion of the mechanism for locking the jacks in the position of presentation. Figs. 8, 9, and 10 are detail views illustrating the mechanism by means of which the mechanism for relatively actuating the jacks and forms is started into operation after having been stopped with a jack and form in a position of pressure. Fig. 11 is a detail sectional view illustrating a clutch member and means for actuating the same hereinafter described, and Fig. 12 is a view in front elevation of the complete machine.

The machine illustrated in the drawings is a direct-pressure sole-pressing machine of that type known in the art as a "gang-machine," which type comprises a plurality of jacks and coöperating sole-pressing forms, the specific machine illustrated being provided with two of such jacks and forms. Both jacks are mounted upon a single table, which is moved vertically to subject the sole of a shoe supported upon either jack to pressure between the jack and its coöperating form. The jacks are mounted in guides on the table, so as to move horizontally from a position of presentation at the front of the machine to a position beneath the sole-pressing forms and to return to the position of presentation after the sole-pressing operation. Automatic mechanism is provided for moving the jacks beneath the forms, for seating the forms upon the jacks, for raising and lowering the table carrying the jacks to produce pressure, and for returning the jacks to a position of presentation. Both forms are yieldingly mounted in a vertically-reciprocating cross-head, so that both forms are moved simultaneously when either form is lowered into contact with a jack or is raised to separate the form from the jack. Since both jacks are mounted upon the same vertically-reciprocating table, the upward and downward movements of the jacks also take place simultaneously. Both jacks are, however, normally disconnected from the mechanism for moving them horizontally from a position of presentation to a position beneath the forms and for returning them to a position of presentation, and means are provided whereby either jack may be connected to this mechanism, so that one jack can remain in a position of presentation while the other jack is being moved to a position beneath one of the forms and returned to a position of presentation. In order to vary the time during which a jack and form are held in a position of pressure to suit variations in the thickness and quality of the soles, means are provided by which the main cam-shaft from which the forms and jacks are operated is stopped with one of the jacks and forms in a position of pressure and by which the shaft is automatically started after a predetermined length of time, which can be varied as desired.

Referring to the drawings, 1 indicates the frame of the machine, of suitable construction for supporting the operating parts. In the lower rear portion of the machine-frame a driving-shaft 2 is journaled, to which are secured a driving-pulley 3 and a worm 4. The worm 4 meshes with the worm-gear 5, secured to the rear end of a shaft 6, journaled in the lower portion of the machine-frame beneath and at right angles to the driving-shaft. Upon the shaft 6 are mounted two worms 7 and 8, the worm 7 being rigidly secured to the shaft and the worm 8 being loosely mounted upon the shaft. The worm 8 is provided with a clutch member 9, which is adapted to be engaged by a clutch member 10, splined on the shaft which is actuated to connect and disconnect the worm 8 and the shaft 6, as will be hereinafter described. The worm 8 meshes with a worm-gear $9^\times$, secured to a cam-shaft $10^\times$, journaled in the frame of the machine parallel with the driving-shaft 2. To the cam-shaft $10^\times$ are secured a cam-disk 11, provided with cam-grooves 12 and 13 in its opposite faces and two cams 14 and 15. (See more particularly Figs. 5 and 6.) By means of the cam-grooves 12 and 13, the cams 14 and 15, and suitable connections the jacks and forms are actuated, as will be described.

The forms may be of any suitable construction adapted to coöperate with the jacks to perform either sole-laying or sole-leveling operations. These forms are secured in any customary or desired manner to form-carriers yieldingly mounted in a vertically-reciprocating cross-head 16. Each form-carrier comprises a plate 17 and an upwardly-extending rod 18, provided upon its upper end with an adjusting-nut 19, which limits the downward movement of the form-carrier with relation to the cross-head 16. Each form-carrier is pressed downwardly by means of a coiled spring 20, surrounding the rod 18 and interposed between a bearing for the upper end of the rod, and an adjusting-nut 21, having a screw-threaded engagement with the rod. By rotating the nut 21 the tension of the spring 20 can be adjusted as desired. The nut 21 is held in its adjusted position by means of a locking-latch 22, which is arranged to engage notches formed in the periphery of the adjusting-nut.

The cross-head 16 is connected, by means of a link 23, to one end of a lever 24, pivotally mounted upon a pivot-rod 25. The rear end of the lever 24 is connected, by means of a link 26, to the free end of a lever 27, pivoted at 28 in the lower rear portion of the machine-frame. The lever 27 is provided with a roll or stud arranged to be engaged by the cam 14, and the connections above described between the cam and the cross-head 16 are such that the cross-head is allowed to move downwardly at the proper time during the operation of the machine to seat one of the forms upon a jack and to be positively raised at the end of the sole-pressing operation.

For locking the cross-head 16 against upward movement during the sole-pressing operation locking-cams 29 are provided secured upon a rock-shaft 30, mounted in bearings in the frame of the machine above the cross-head 16. The shaft 30 is provided with an arm 31, which is connected, by means of a link 32, to an arm 33, projecting rearwardly from a sleeve 34, mounted upon the pivot-rod 25. Also projecting rearwardly from the sleeve 34 is an arm 35, which is connected, by means of a link 36, to the free end of a lever 37, pivoted at 28, and provided intermediate its ends with a roll or stud arranged to be engaged by the cam 15. The link 32 is acted upon by a coiled spring 38, connecting the link with a fixed portion of the machine-frame. The above-described connections between the cam 15 and the rock-shaft 30 are such that the cams 29 are positively moved to allow the cross-head 16 to be raised after the sole-pressing operation and are moved by the force of spring 38 to lock the cross-head against upward movement after a form has been seated upon a jack. The cross-head 16 is moved by gravity to seat a form upon a jack, and the extent of its downward movement will vary with the thickness of the sole of the shoe being operated upon or upon the height of the last. The provision of the spring 38 for moving the cams into locking position allows the cams to securely lock the cross-head in any position to which it may be moved in seating a form upon a jack.

The jacks may be of any convenient or common form suitable for holding a wooden or iron last or any suitable device for supporting the shoe after removal from the wooden last. The jacks are indicated at 39 and, as illustrated, are mounted to slide in horizontal guideways upon a table 40, supported at the upper end of a sliding cross-head 41, mounted in vertical guideways beneath the cross-head 16, upon which the form-carriers are supported. The table 40 is raised and lowered at the proper time during the operation of the machine to subject the sole of a shoe supported upon one of the jacks to pressure between the jack and its coöperating form by means of a toggle 42, the lower arm of which is pivotally supported upon the frame of the machine and the upper arm of which is pivotally connected with the cross-head 41. The toggle is operated from the cam-groove 13 by means of a link 43, which connects the pivotal connection of the arms of the toggle with the upper end of an arm 44, pivotally mounted on the frame of the machine and provided with a roll or stud engaging the cam-groove 13.

Each jack is connected, by means of a link 45, to a lever 46, pivotally mounted upon a pivot-rod 47, extending across the lower front portion of the cross-head 41. The levers 46 are mounted independently of each other, so that one lever can be swung about its pivot to impart an inward and outward movement to the jack to which it is connected without moving the other lever. Links 48 extend through slots in levers 46 and are provided with open-ended slots arranged to engage pins 49, extending across the slots in the levers, the construction being such that when the links are raised they are disconnected from the levers 46 and are allowed to move inwardly and outwardly without actuating the levers. Each link 48 at its rear end is connected to an arm 50, projecting upwardly from a rock-shaft 51, both arms 50 being fast on the rock-shaft, so that when the shaft is rocked both arms and the links connected therewith are actuated. Also secured to the rock-shaft 51 is an arm 52, provided at its upper end with a roll or stud, which engages the cam-groove 12 in the disk 11. The above-described connections between the cam-groove 12 and the jacks are such that when either link 48 is connected to a lever 46 the jack connected to the lever is moved inwardly and outwardly on the table 40 at the proper time during the operation of the machine, the links constituting latches by means of which the jacks are connected to their operating mechanism. When the machine is at rest with the table 40 in its lowered position, both links are raised out of engagement with the levers 46. Also both jacks are in the position of presentation at the front of the machine and are locked against movement with relation to the table 40. By allowing one of the links 48 to drop into engagement with the pin 49 of one of the levers 46 and by unlocking the jack to which the lever 46 is connected one of the jacks can be operated to press the sole of a shoe supported thereon when the machine is thrown into operation, the other jack remaining in the position of presentation until the sole-pressing operation has been completed and the jack which is being actuated returned to the position of presentation.

The jacks are locked in the position of presentation by means of spring-pressed latches in the form of locking-rods 53, which are mounted to slide vertically in bearings formed on the cross-head 41. These rods are pressed upwardly by means of springs 54, coiled around the rods and interposed between the lower bearings and arms 55, fixed to the rods, the upper ends of the rods being received in openings formed in the under sides of the jacks when the jacks are in the position of presentation and being pressed against the lower surfaces of the jacks during their inward and outward movements. When the rods 53 are in their raised position, the links 48 are held out of engagement with the pins 49 of the arms 46 by means of the arms 55, secured to the rods which project under the links. By this arrangement the downward movement of one of the rods 53 to release a jack simultaneously allows the corresponding link 48 to move into engagement with its arm 46. The rods 53 are depressed by means of treadle-levers 56, pivoted at 57 to the frame of the machine and provided with projections arranged to engage arms 58, projecting from the lower ends of the rods 53.

In the machine illustrated in the drawings the driving-shaft 2 and the shaft 6 are rotated continuously, the cam-shaft $10^\times$ being started into operation and stopped by moving the clutch member 10 into and out of engagement with the clutch member 9 of the worm 8. For moving the clutch member 10 a shipper-rod 59 is provided, mounted to slide longitudinally and rotate in bearings in the machine-frame. Upon this shipper-rod is loosely mounted an arm 60, which engages the clutch member 10 and which is moved longitudinally with the shipper-rod by means of collars fixed to the rod on opposite sides of the arm. To the shipper-rod 59 an arm 61 is secured, the upper end of which extends into the path of movement of a projection 62 upon the face of the worm-gear $9^\times$. When the cam-shaft $10^\times$ is at rest, with both jacks in the position of presentation at the front of the machine, the arm 61 is engaged by the projection 62, as illustrated in Fig. 2, and the shipper-rod 59 is pressed toward the right, with the clutch member 10 out of engagement with the clutch member 9. In order to start the machine into operation, the arm 61 is rocked to move its upper end out of engagement with the projection 62, and the shipper-rod 59 is moved toward the left to bring the clutch member 10 into engagement with the clutch member 9 by means of a spring 63, coiled around the rod and having one end secured to the frame of the machine and the other end secured to a collar fixed to the rod. In the machine shown in the drawings the arm 61 is rocked simultaneously with the depression of one of the locking-rods 53 and the engagement of one of the links 48 with a lever 46. To this end each of the treadle-levers 56 is extended rearwardly and is provided at its rear end with a cam-surface 64, arranged to engage one of two collars secured to a rod 65, mounted to slide in bearings in the machine-frame and arranged when actuated by the depression of either treadle to engage the lower end of the arm 61 and rock the upper end of the arm out of engagement with the projection 62. The rod 65 is normally held in its extreme position at the left, as viewed in Fig. 4, by means of a spring 66, coiled around the rod and interposed between the frame of the machine and a collar fixed to the end of the rod. The upper end of the arm 61 is returned into the path of the projection 62 as soon as the treadle 56 is released by the action of the spring 63. The worm-gear $9^\times$ is also provided with a projection 67, located on the same face of the gear as the projection 62, but diametrically opposite, which is arranged to engage the arm 61 and move the clutch member 10 out of engagement with the clutch member 9 when a jack and form have been brought into a position of pressure. In order to start the cam-shaft $10^\times$ into operation and allow it to complete its revolution, so as to separate the jack and form and return the jack to its position of presentation, mechanism is provided for rocking the arm 61, which mechanism is thrown into operation simultaneously with or slightly before the engagement of the projection 67 with the arm 61. This mechanism for moving the arm 61 to again throw the cam-shaft into operation is clearly illustrated in Figs. 2, 8, 9, and 10. Referring to these figures, 68 indicates a shaft, journaled in bearings in the machine-frame below and at right angles to the shaft 6. This shaft is constantly rotated by means of a worm-gear 69, which meshes with the worm 7, fast upon the constantly-rotating shaft 6. Secured to the shaft 68 is a spiral cam or worm 70, which is arranged to engage one end of a lever 71, pivotally mounted upon a block secured to a rod 72, mounted to reciprocate longitudinally in bearings in the machine-frame. The other end of the lever 71 extends beyond the lower end of the arm 61 and is provided with an offset arranged to engage the arm 61 when the lever 71 and the rod 72 are moved longitudinally by the worm 70 and rock the arm so as to move its upper end out of engagement with the projection 67. The lever 71 is normally held out of engagement with the worm 70 by means of a latch 73, secured to the lower end of a spring-pressed plunger 74, mounted to slide vertically in the frame of the machine. When the lever 71 is out of engagement with the worm 70, the rod 72 is held in its extreme position to the left, as viewed in Figs. 9 and 10, by means of a coiled spring 75. A leaf-spring 76 serves to force the lever 71 into engagement with the worm 70 when the lever is released by the latch 73. The latch 73 is actuated to release the lever 71 by means of a projection 77 on the worm-gear $9^\times$, located in proximity to the projection 67, but upon the opposite face of the gear. This projection is brought into engagement with the spring-pressed plunger 74 simultaneously with or slightly before the engagement of the projection 67 with the arm 61. The movement of the rod 72 to the left, as viewed in Figs. 9 and 10, is limited by a collar 78, adjustably secured to the rod 72, which contacts with a fixed portion of the machine-frame. The time during which the cam-shaft remains at rest with a jack and form in a position of pressure depends upon the point of the worm 70, which is engaged by the lever 71 when the lever is released by the depression of the latch 73. By adjusting the collar 78 the lever 71 can be caused to engage different points on the worm 70 and the time during which the jack and form is held under pressure varied as desired.

It is desirable that means be provided for preventing a locking-rod 53 from being raised so as to again lock the jack on the table 40 in case a treadle-lever 56 is released after being depressed before the jack has been actuated to move the opening in the jack out of line with the rod. A means for accomplishing this result is illustrated in Fig. 7, in which 79 is a spring-pressed latch pivotally mounted on the jack in position to bear against the upper end of the locking-rod 53 when in raised position and swing over the end of the rod as soon as it is depressed, and thereby hold it out of engagement with the opening in the jack until the jack has been actuated to move the opening out of line with the rod. If the treadle-lever is released before the opening in the jack is moved out of line with the rod, the rod rises until its upper end engages the lower surface of the latch 79, the latch at this time being over the hole in the jack and preventing the rod from entering the hole. During the first portion of the inward movement of the jack the latch slides over the rod, and during the continued inward movement of the jack the latch passes off of the end of the rod, and the rod rises a short distance until its upper end contacts with the lower surface of the jack. The forward end of the latch 79 is beveled, as shown, so that upon the return movement of the jack to a position of presentation the latch is swung to one side by the engagement of the upper end of the locking-rod therewith.

The operation of the machine above described is as follows: The normal position of the various parts of the machine are as illustrated in the drawings, the projection 62 being in engagement with the arm 61 and both jacks being in their position of presentation locked to the table 40 and disconnected from their actuating mechanism. A shoe having been placed upon one of the jacks, the corresponding treadle 56 is depressed The depression of the treadle depresses a locking-rod 53 to unlock the jack upon which the shoe has been placed and simultaneously allows a link 48 to engage the pin 49 of a lever 46. Simultaneously with the depression of the locking-rod and the engagement of the link 48 with the pin 49 the rod 65 is moved by the engagement of the cam-surface with a collar on the rod to rock the arm 61 and remove its upper end from engagement with the projection 62. The clutch member 10 is moved into engagement with the clutch member 9, and thereby the cam-shaft $10^\times$ is started. As soon as the treadle 56 is released the arm 61 is returned to its original position. The cam-shaft $10^\times$ rotates through half a revolution, and during this half of its revolution the jack upon which the shoe has been placed is moved inwardly to a position beneath one of the forms, the cross-head in which the form-carriers are mounted is lowered to seat a form upon the jack, and the table 40 is raised to force the jack toward the form, thereby subjecting the sole of the shoe to pressure. As soon as the jack and form reach the position of pressure the projection 67 engages the arm 61 and moves the clutch member 10 out of engagement with the clutch member 9, thereby stopping the rotation of the cam-shaft. Simultaneously with the engagement of the projection 67 with the arm 61, or slightly before, the projection 77 depresses the plunger 74 and moves the latch 73 out of engagement with the lever 71. The lever 71 is immediately moved into engagement with the continuously-rotating worm 70, and the lever and the rod 72, upon which it is supported, are moved to the right, as viewed in Figs. 9 and 10, until the offset on the lever 71 engages the arm 61 and rocks the upper end of the arm out of engagement with the projection 67. The shipper-rod 59 and the arm 61 are immediately moved to the left, as viewed in Figs. 2 and 8, the clutch member 10 is brought into engagement with the clutch member 9, and simultaneously the lever 71 is rocked by the engagement of the arm 61 with the lever, so as to allow it to be engaged by the latch 73. As soon as the lever 71 is released from the worm 70 and engaged by the latch 73 the lever and rod 72, upon which it is mounted, are returned to their normal position by the action of the spring 75. The cam-shaft $10^\times$ having been started rotates through another half of a revolution, when it is automatically stopped by the engagement of the projection 62 with the arm 61. During this half of the revolution of the cam-shaft the cross-head carrying the forms is raised, the table 40 is lowered, and the jack is returned to its position of presentation at the front of the machine.

Having thus indicated the nature and scope of my invention, and having specifically described a machine embodying a preferred form thereof, I claim as new and desire to secure by Letters Patent of the United States—

1. A sole-pressing machine, having, in combination, a shoe-supporting jack, a sole-pressing form, mechanism acting automatically to bring the jack and form into a position of pressure to hold the jack and form in such position and thereafter separate the jack and form, and means for varying the time during which the jack and form are held in a position of pressure, substantially as described.

2. A sole-pressing machine, having, in combination, a shoe-supporting jack, a sole-pressing form, mechanism for relatively actuating the jack and form to press the sole of a shoe, means acting automatically to stop said mechanism with the jack and form in a position of pressure, and means acting automatically to thereafter start said mechanism into operation, substantially as described.

3. A sole-pressing machine, having, in combination, a shoe-supporting jack, a sole-pressing form, mechanism for relatively actuating the jack and form to press the sole of a shoe, means acting automatically to stop said mechanism with the jack and form in a position of pressure, and means acting automatically to thereafter start said mechanism into operation having provision for adjustment to vary the time during which the jack and form are held in a position of pressure, substantially as described.

4. A sole-pressing machine, having, in combination, a shoe-supporting jack, a sole-pressing form, mechanism for relatively actuating the jack and form to press the sole of a shoe, means acting automatically to stop said actuating mechanism with the jack and form in a position of pressure, normally inoperative mechanism acting automatically when thrown into operation to start said actuating mechanism, and means acting automatically to throw said normally inoperative mechanism into operation, substantially as described.

5. A sole-pressing machine, having, in combination, a shoe-supporting jack, a sole-pressing form, mechanism acting automatically to bring the jack and form into a position of pressure, to hold the jack and form in such position, and thereafter return the jack to a position of presentation, and means for varying the time during which the jack and form are held in a position of pressure, substantially as described.

6. A sole-pressing machine, having, in combination, a shoe-supporting jack, a sole-pressing form, mechanism for relatively actuating the jack and form to bring them into a position of pressure, to hold them in such position and thereafter return the jack to a position of presentation, means acting automatically to stop said mechanism with the jack and form in a position of pressure, and means acting automatically to thereafter start said mechanism into operation, substantially as described.

7. A sole-pressing machine, having, in combination, a shoe-supporting jack, a sole-pressing form, mechanism for relatively actuating the jack and form to bring them into a position of pressure, to hold them in such position and thereafter return the jack to a position of presentation, means acting automatically to stop said mechanism with the jack and form in a position of pressure, and means acting automatically to thereafter start said mechanism into operation having provision for adjustment to vary the time during which the jack and form are held in a position of pressure, substantially as described.

8. A sole-pressing machine, having, in combination, a plurality of shoe-supporting jacks, a plurality of coöperating sole-pressing forms, mechanism acting automatically to bring each jack and form into a position of pressure to hold the jack and form in such position and thereafter separate the jack and form, means for throwing each jack and its coöperating form into and out of operative connection with said mechanism and means for varying the time during which the jack and form are held in a position of pressure, substantially as described.

9. A sole-pressing machine, having, in combination, a plurality of shoe-supporting jacks, a plurality of coöperating sole-pressing forms, mechanism acting automatically to bring each jack and form into a position of pressure to hold the jack and form in such position and thereafter return the jack to position of presentation, means for throwing each jack and its coöperating form into and out of operative connection with said mechanism and means for varying the time during which the jack and form are held in a position of pressure, substantially as described.

10. A sole-pressing machine, having, in combination, a plurality of shoe-supporting jacks, a plurality of coöperating sole-pressing forms, mechanism for relatively actuating each jack and its coöperating form to press the sole of the shoe, means for throwing each jack and its coöperating form into and out of operative connection with said mechanism, means acting automatically to stop said mechanism with a jack and form in a position of pressure, and means acting automatically to thereafter start said mechanism into operation, substantially as described.

11. A sole-pressing machine, having, in combination, a plurality of shoe-supporting jacks, a plurality of coöperating sole-pressing forms, mechanism for relatively actuating each jack and its coöperating form to press the sole of the shoe, means for throwing each jack and its coöperating form into and out of operative connection with said mechanism, means acting automatically to stop said mechanism with a jack and form in a position of pressure, and means acting automatically to thereafter start said mechanism into operation having provision for adjustment to vary the time during which the jack and form are held in a position of pressure, substantially as described.

12. A sole-pressing machine, having, in combination, a plurality of shoe-supporting jacks, a plurality of coöperating sole-pressing forms, mechanism for relatively actuating each jack and form to press the sole of a shoe, and to return the jack to its position of presentation, means for connecting and disconnecting each jack and said actuating mechanism, and means for locking each jack in its position of presentation, substantially as described.

13. A sole-pressing machine, having, in combination, a plurality of shoe-supporting jacks, a plurality of coöperating sole-pressing forms, mechanism for relatively actuating each jack and form to press the sole of a shoe and to return the jack to its position of presentation, means for locking each jack in its position of presentation, and a treadle and suitable connections for unlocking a jack, for connecting a jack to the mechanism for relatively actuating said jack and its coöperating form, and for throwing said mechanism into operation, substantially as described.

14. A sole-pressing machine, having, in combination, a shoe-supporting jack, a coöperating sole-pressing form, mechanism for relatively actuating the jack and form to press the sole of a shoe and to return the jack to its position of presentation, means for locking the jack in its position of presentation, and a treadle and suitable connections for unlocking the jack and for throwing the mechanism for relatively actuating the jack and form into operation, substantially as described.

15. A sole-pressing machine, having, in combination, a shoe-supporting jack and a sole-pressing form coöperating to level the sole of a shoe placed on the jack, mechanism for relatively actuating the jack and form comprising an intermittently-rotating cam-shaft, a constantly-rotating driving-shaft, and connections between the driving-shaft and cam-shaft acting automatically to stop the cam-shaft with the jack and form in a position of pressure and thereafter start the cam-shaft, substantially as described.

16. A sole-pressing machine, having, in combination, a shoe-supporting jack and a pressing-form coöperating to press the sole of a shoe placed on the jack, means for actuating the jack, a latch for holding the jack in a position of presentation, a latch for connecting the jack with its actuating mechanism, and mechanism connected with both latches for actuating the same to release the jack and connect it with its actuating mechanism, substantially as described.

17. A sole-pressing machine, having, in combination, a jack and a pressing form coöperating to press the sole of a shoe placed on the jack, a spring-pressed latch for holding the jack in a position of presentation, mechanism controlled by the operator for disengaging the latch from the jack, and means for preventing a reëngagement of the latch with the jack until the machine has completed its cycle of operations, substantially as described.

18. A sole-pressing machine, having, in combination, a shoe-supporting jack and a pressing-form coöperating to press the sole of a shoe placed on the jack, means for holding the jack in a position of presentation, means for connecting the jack with its actuating mechanism, and mechanism connected with both of said means whereby one is rendered inoperative when the other is rendered operative, substantially as described.

19. A sole-pressing machine, having, in combination, a shoe-supporting jack and a pressing-form coöperating to press the sole of a shoe placed on the jack, means for holding the jack in a position of presentation, mechanism controlled by the operator for rendering said means inoperative, and a device for maintaining said means inoperative until the machine has completed its cycle of operations, substantially as described.

20. A sole-pressing machine, having, in combination a shoe-supporting jack and a pressing-form coöperating to press the sole of a shoe placed on the jack, means for holding the jack in a position of presentation, mechanism controlled by the operator for rendering said means inoperative, a device acting to maintain said means inoperative until the machine has completed its cycle of operations and then allow said means to become operative, and means acting automatically to actuate said device, substantially as described.

In testimony whereof I affix my signature in presence of two witnesses.

ERASTUS E. WINKLEY.

Witnesses:
C. W. DOANE,
ALFRED H. HILDRETH.